United States Patent
Park

(10) Patent No.: US 10,105,633 B2
(45) Date of Patent: Oct. 23, 2018

(54) SENSOR-BASED MOTION CONTROL DUST SCATTERING SUPPRESSION SYSTEM

(71) Applicant: HYUNJIN CONSTRUCTION CO., LTD., Yeongju-si, Gyeongsangbuk-do (KR)

(72) Inventor: Jong Hyup Park, Bucheon-si (KR)

(73) Assignees: HYUNJIN CONSTRUCTION CO., LTD., Yeongju-si, Gyeongsangbuk-do (KR); Jong Hyup Park, Bucheon-si, Gyeonggi-do (KR)

( * ) Notice: Subject to any disclaimer, the term of this patent is extended or adjusted under 35 U.S.C. 154(b) by 110 days.

(21) Appl. No.: 15/314,094

(22) PCT Filed: Jun. 11, 2015

(86) PCT No.: PCT/KR2015/005860
§ 371 (c)(1),
(2) Date: Nov. 28, 2016

(87) PCT Pub. No.: WO2015/194789
PCT Pub. Date: Dec. 23, 2015

(65) Prior Publication Data
US 2017/0189848 A1    Jul. 6, 2017

(30) Foreign Application Priority Data

Jun. 17, 2014  (KR) ........................ 10-2014-0073414

(51) Int. Cl.
*B01D 47/00*  (2006.01)
*F02M 37/00*  (2006.01)
(Continued)

(52) U.S. Cl.
CPC ................ *B01D 47/08* (2013.01); *B08B 3/02* (2013.01); *B08B 15/00* (2013.01); *B28D 7/02* (2013.01); *B08B 2215/003* (2013.01)

(58) Field of Classification Search
None
See application file for complete search history.

(56) References Cited

U.S. PATENT DOCUMENTS 6,223,995 B1 *  5/2001  Evans ................. A01G 13/065
                                           239/14.1
6,954,719 B2 * 10/2005  Carter, Jr. ................ E21F 5/00
                                           700/245
(Continued)

FOREIGN PATENT DOCUMENTS

KR     20-2010-0005230 U      5/2010
KR     10-2010-0106772 A     10/2010
(Continued)

OTHER PUBLICATIONS

International Search Report for PCT/KR2015/005860 dated Oct. 19, 2015 from Korean Intellectual Property Office.

*Primary Examiner* — Amber Rose Orlando
*Assistant Examiner* — Phillip Y Shao
(74) *Attorney, Agent, or Firm* — Revolution IP, PLLC

(57) ABSTRACT

A sensor-based motion control fugitive dust suppression system comprises: a laser pointer provided on a frame to conduct a setting operation such that directions of a plurality of mist spray injection nozzles provided on a blast pipe located inside the frame correspond to the front end of a chisel of a hydraulic breaker; a data logger for collecting, from a sensor provided at the crushing apparatus, location source information for a hitting impact point of the hitting part; a location information processing unit analyzing the location source information collected from the data logger so as to generate the location information on the hitting impact point of the hitting part; and a system control unit for outputting a control signal so as to control a driving unit rotating the blast pipe in a vertical or horizontal direction, according to the location source information.

8 Claims, 7 Drawing Sheets

(51) Int. Cl.
    *F02M 69/02*     (2006.01)
    *B01D 47/08*     (2006.01)
    *B08B 15/00*     (2006.01)
    *B08B 3/02*     (2006.01)
    *B28D 7/02*     (2006.01)

(56) References Cited

U.S. PATENT DOCUMENTS

| | | | |
|---|---|---|---|
| 8,657,941 B2* | 2/2014 | Hutchinson | B01D 47/06 239/172 |
| 2007/0186778 A1* | 8/2007 | Peterson | B01D 47/06 96/281 |
| 2009/0166444 A1* | 7/2009 | Peterson | F04D 29/601 239/13 |
| 2010/0126340 A1* | 5/2010 | Peterson | A61L 9/14 95/32 |
| 2011/0160919 A1* | 6/2011 | Orr | A01M 7/0089 700/283 |
| 2011/0266360 A1* | 11/2011 | Gudat | E01H 3/02 239/11 |

FOREIGN PATENT DOCUMENTS

| | | |
|---|---|---|
| KR | 10-1247181 B1 | 3/2013 |
| KR | 10-2013-0142260 A | 12/2013 |
| KR | 10-2014-0053727 A | 5/2014 |
| KR | 10-1397246 B1 | 5/2014 |

\* cited by examiner

SENSOR-BASED MOTION CONTROL DUST SCATTERING SUPPRESSION SYSTEM

CROSS REFERENCE TO PRIOR APPLICATIONS

This application is a National Stage Application of PCT International Patent Application No. PCT/KR2015/005860 filed on Jun. 11, 2015, under 35 U.S.C. § 371, which claims priority to Korean Patent Application No. 10-2014-0073414 filed on Jun. 17, 2014, which are all hereby incorporated by reference in their entirety.

TECHNICAL FIELD

The present invention relates to a sensor-based motion control fugitive dust suppression system and, more particularly, to a sensor-based motion control fugitive dust suppression system that is capable of controlling vertical and horizontal motions of a blast pipe, so that mist spray injection directions correspond to a hitting impact point of a crushing machine on a removal site of a structure like a building or bridge, thereby more effectively suppressing the fugitive dust, reducing an amount of water consumed, and minimizing the environmental pollution of soil.

BACKGROUND ART

Generally, a structure like a building or bridge is removed through breakage using a breaker or crusher, explosive blasting, core drill, and cutting using a wheel saw or diamond wire saw, and accordingly, since a large amount of fugitive dust is generated on the removal site of the structure, the suppression of the fugitive dust is one of the solutions capable of solving various environmental problems.

A conventional method for suppressing fugitive dust on the removal site of a structure is carried out through water spray using a labor force, as shown in FIG. 1. In this case, however, a safety problem of a worker 1 may occur. In more detail, since the worker 1 conducts a water spraying operation around a crushing machine like a hydraulic breaker or crusher, his or her body may be damaged by the collapse of the structure and the dispersion of the broken pieces of the structure, and since a substantially large amount of water sprayed is mixed with concrete dust, soil may be polluted to cause serious secondary environmental damages.

So as to remove the above-mentioned conventional problems, recently, a method using a fugitive dust suppression system under the principle of slipstream effects is positively utilized to suppress the fugitive dust generated on the removal site of the structure. In this case, when fine spray water particles are injected from a plurality of nozzles located to the shape of a circle, they are injected into a wide range of area, while slipping along a high speed air flow produced by a propeller fan, so that air and water are mixed with each other to allow fugitive dust to be wet and dropped to the ground, thereby suppressing the fugitive dust.

One example of such fugitive dust suppression system is disclosed in Korean Patent Application Laid-Open No. 10-2013-0142260 (dated on Dec. 30, 2013 and entitled "water spray device for removing fugitive dust"). As shown in FIG. 2, a water spray device for spraying an outside front through blowing within a housing 10 includes a casing 30 disposed by means of a support rod 20 in an internal through portion 12 of the housing 10, a holder 40 disposed on the front of the casing 30 and having a plurality of first nozzles 32, 32a, 34 and 34a arranged thereon, and a pipe 50 connected to the holder 40 to supply a fluid to the holder 40, and further, a water spray line and a nozzle are disposed on the center and front surface of the housing 10, so that water is finely sprayed through the water spray device to allow an appropriate amount of water to be added and mixed to powder or fugitive dust, thereby effectively removing the powder or fugitive dust generated on an industrial or construction site, extending the spray distance of water through the first and second injection nozzles, allowing the water to be injected through the rotation in the housing 10 to adjust the range of water spraying, and improving the working efficiency and economical effects. In this case, the mist spray should be injected toward a hitting impact point at which the largest amount of fugitive dust is momentarily generated on breaking positions varied in real time while the crushing machine like a hydraulic breaker or crusher is being used. According to the conventional water spray device for removing fugitive dust, however, the mist spray injection directions should correspond to the hitting impact point of the crushing machine only through the manipulation of the worker in an inconvenient manner.

In addition, the mist spray injection directions do not correspond to the hitting impact point of the crushing machine in real time, so that the fugitive dust cannot be effectively suppressed, and besides, the mist spray is unnecessarily injected toward other positions deviated from the hitting impact point of the crushing machine, thereby undesirably increasing the amount of water consumed.

DISCLOSURE

Technical Problem

Accordingly, the present invention has been made in view of the above-mentioned problems occurring in the prior art, and it is an object of the present invention to provide a sensor-based motion control fugitive dust suppression system that is capable of controlling vertical and horizontal motions of a blast pipe, so that mist spray injection directions correspond to a hitting impact point of a crushing machine on a removal site of a structure like a building or bridge, thereby more effectively suppressing the fugitive dust, reducing an amount of water consumed, and minimizing the environmental pollution of soil.

Technical Solution

To accomplish the above-mentioned object, according to the present invention, there is provided a sensor-based motion control fugitive dust suppression system, the system including: a laser pointer provided on a frame to conduct a setting operation such that directions of a plurality of mist spray injection nozzles provided on a blast pipe located inside the frame correspond to the front end of a chisel of a hydraulic breaker, which is a hitting part of a crushing machine; a data logger for collecting, from a sensor provided on the crushing machine, location source information on a hitting impact point of the hitting part; and a system controller having a location information processing unit adapted to analyze the location source information collected from the data logger so as to generate the location information on the hitting impact point of the hitting part and for outputting a control signal so that under the control signal, a driver rotates the blast pipe in a vertical or horizontal direction according to the location source information, wherein the fugitive dust suppression system and the hitting impact point of the crushing machine correspond to each other with respect to real-time motion.

According to the present invention, desirably, the system controller further includes: a control program used to convert the location information of the location information processing unit into a control value for controlling the driver; and a command signal generating unit for converting the control value into a command signal to output the command signal.

According to the present invention, desirably, the driver includes: a vertical motion driving unit for rotating the blast pipe to a given angle in upward and downward directions; a horizontal motion driving unit for rotating the blast pipe to an angle of 360°; a solenoid valve for adjusting a quantity of water supplied from a water tank to the interior of a misting ring having the plurality of mist spray injection nozzles mounted therearound; and a propeller fan disposed at the interior of the blast pipe to suck air into the blast pipe, adjust the strength of blasting air, and discharge the sucked air to the outside.

According to the present invention, desirably, the crushing machine is any one of a hydraulic breaker and a crusher connected to the front ends of arms of an excavator.

According to the present invention, desirably, the vertical motion driving unit includes: the frame having a shape of a wing to rotatably support a motor shaft and a rotary shaft thereagainst, the motor shaft and the rotary shaft being connected to fixed shafts symmetrically fixed to both side peripheral surfaces of the blast pipe; a first rotary motor fixedly disposed on the outer surface of one side of the frame in such a manner as to be rotated forwardly and reversely, the first rotary motor being adapted to drive the motor shaft; and first bearings disposed symmetrically on the outer surfaces of both sides of the frame to rotatably insert the motor shaft and the rotary shaft thereinto.

According to the present invention, desirably, the first rotary motor is a tilt motor.

According to the present invention, desirably, the horizontal motion driving unit includes: a moving equipment connection plate fixedly mounted on moving equipment; a base mounted on top of the moving equipment connection plate; a support member mounted on top of the base; a second rotary motor fixedly mounted on top of the base at the inside of the support member in such a manner as to be rotated forwardly and reversely; a turn table fixedly disposed on a connection member insertedly fixed to a motor shaft of the second rotary motor to fix the frame of the vertical motion driving unit to the top surface thereof in such a manner as to be rotated to an angle of 360°; and second bearings interposed between the peripheries of the turn table and the support member.

According to the present invention, desirably, the second rotary motor is a reduction motor.

Advantageous Effects

According to the present invention, the sensor-based motion control fugitive dust suppression system is set by means of the laser point disposed thereon so that the directions of the mist spray injection nozzles correspond to the front end of the chisel of the hydraulic breaker as the hitting part of the crushing machine, and in accordance with the control signal of the system controller, next, the blast pipe of the fugitive dust suppression system is rotated to a given angle upwardly and downwardly through the vertical motion driving unit and rotated to an angle of 360° through the horizontal motion driving unit, thereby allowing the mist spray injection directions of the nozzles to correspond to the hitting impact point of the crushing machine. When the structure like a building or bridge is broken by the crushing machine on the removal site thereof, accordingly, the mist spray is injected from the nozzles toward the hitting impact point at which fugitive dust is most seriously generated, thereby minimizing the fugitive dust scattering in the air, and further, the unnecessary injection of the mist spray toward other positions deviated from the hitting impact point of the crushing machine is prevented, thereby reducing an amount of water consumed and minimizing the environmental pollution of soil.

MODE FOR INVENTION

Figure 1:
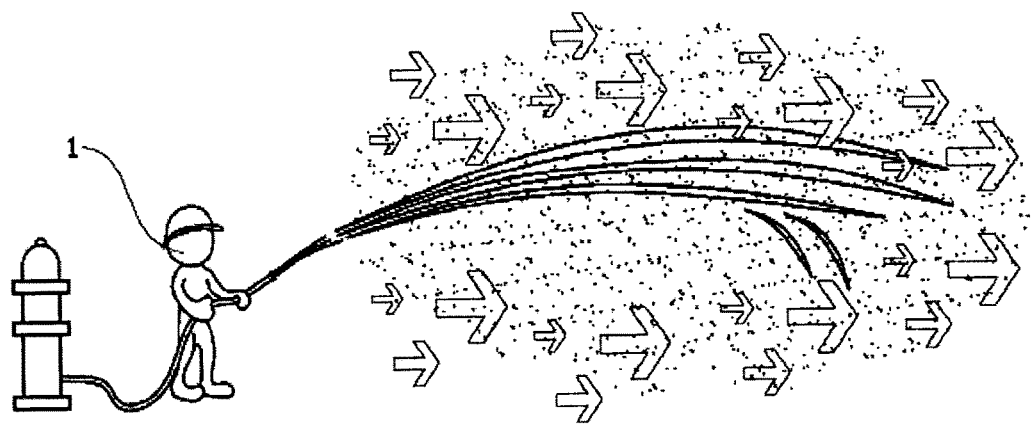
FIG. 1 is an exemplary view showing a conventional method for suppressing fugitive dust by means of a labor force.
Figure 2:
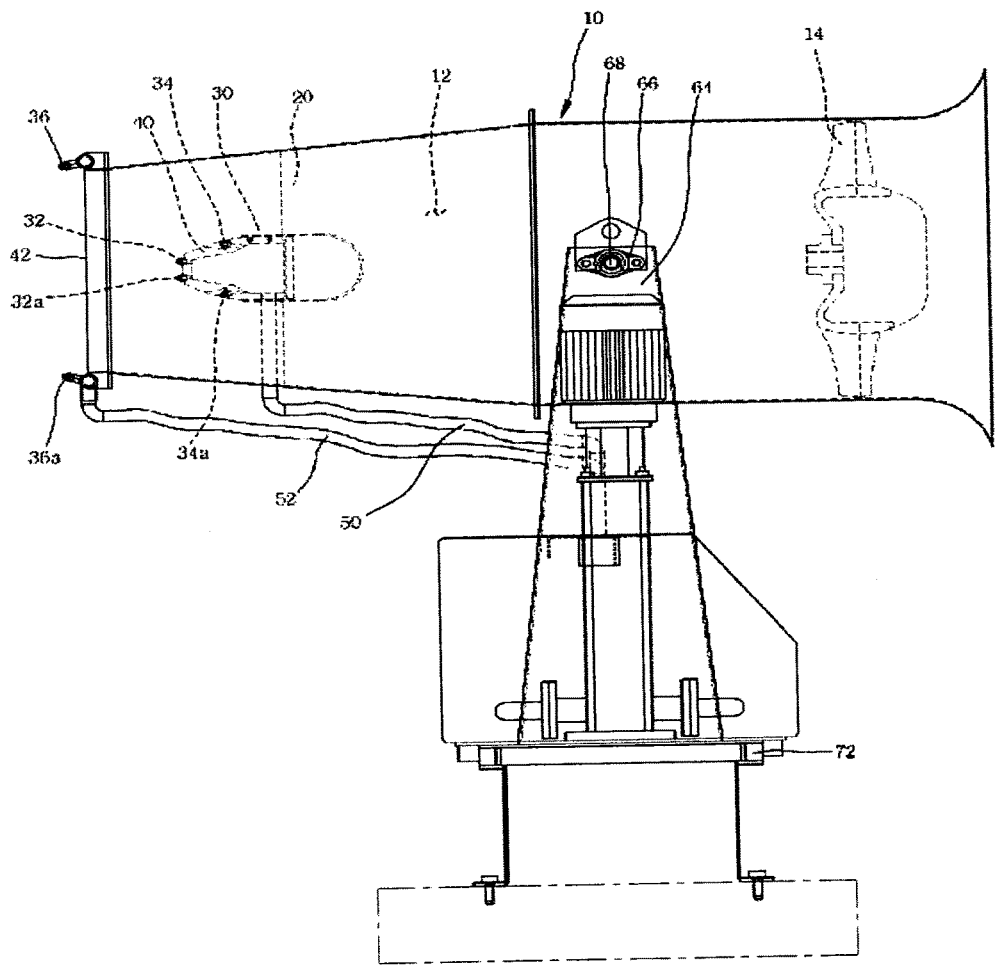
FIG. 2 is an exemplary view showing a method for suppressing fugitive dust through a conventional fugitive dust suppression system.

Hereinafter, an explanation on a sensor-based motion control fugitive dust suppression system according to the present invention will be in detail given with reference to the attached drawing.

The present invention may be modified in various ways and may have several exemplary embodiments. Specific exemplary embodiments of the present invention are illustrated in the drawings and described in detail in the detailed description. However, this does not limit the invention within specific embodiments.

In the description, the shapes of the components shown in the drawing may be magnified for the clarity and convenience of the description, and the same reference numerals in the drawing will be used to describe the same components. If it is determined that the detailed explanation on the well known technology related to the present invention makes the scope of the present invention not clear, the explanation will be avoided for the brevity of the description.

Figure 3:
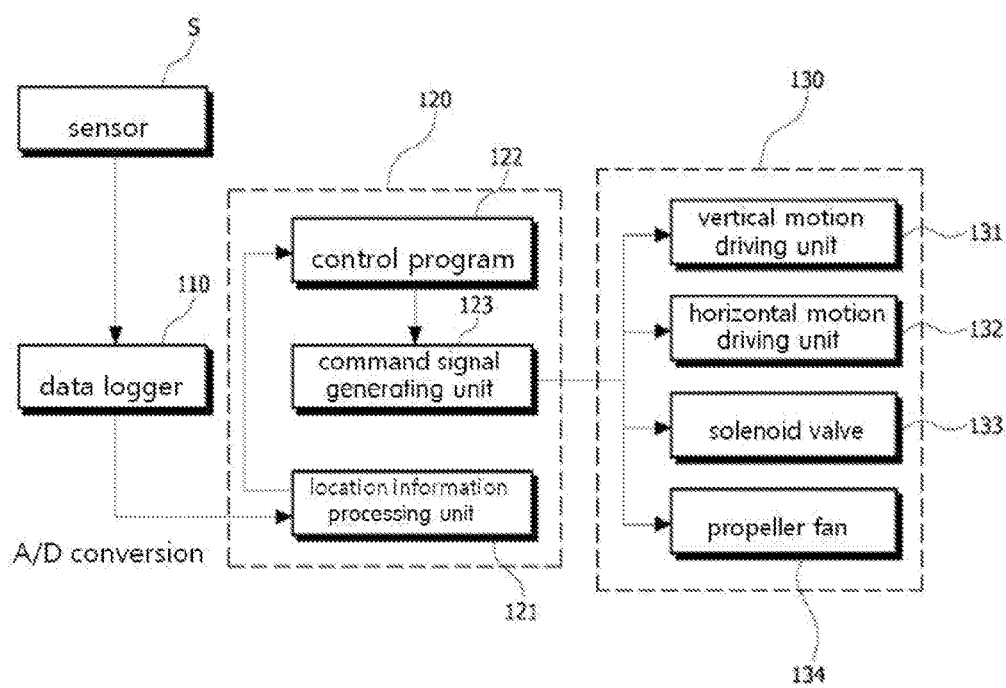
FIG. 3 is a block diagram showing a sensor-based motion control fugitive dust suppression system according to the present invention.
Figure 4:
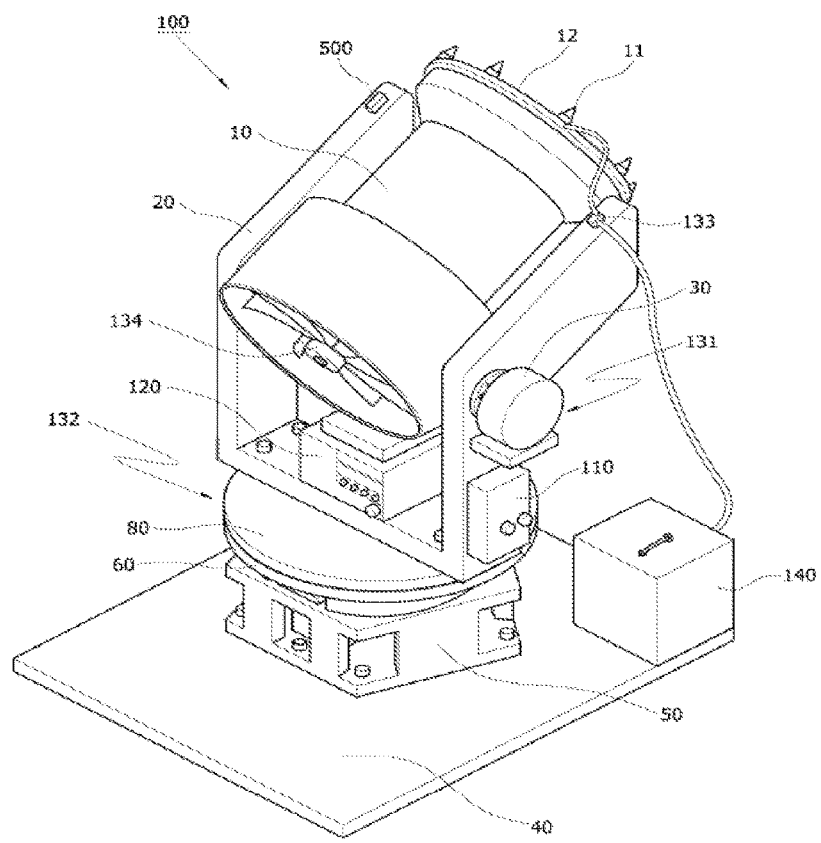
FIG. 4 is a perspective view showing the sensor-based motion control fugitive dust suppression system according to the present invention.
Figure 5:
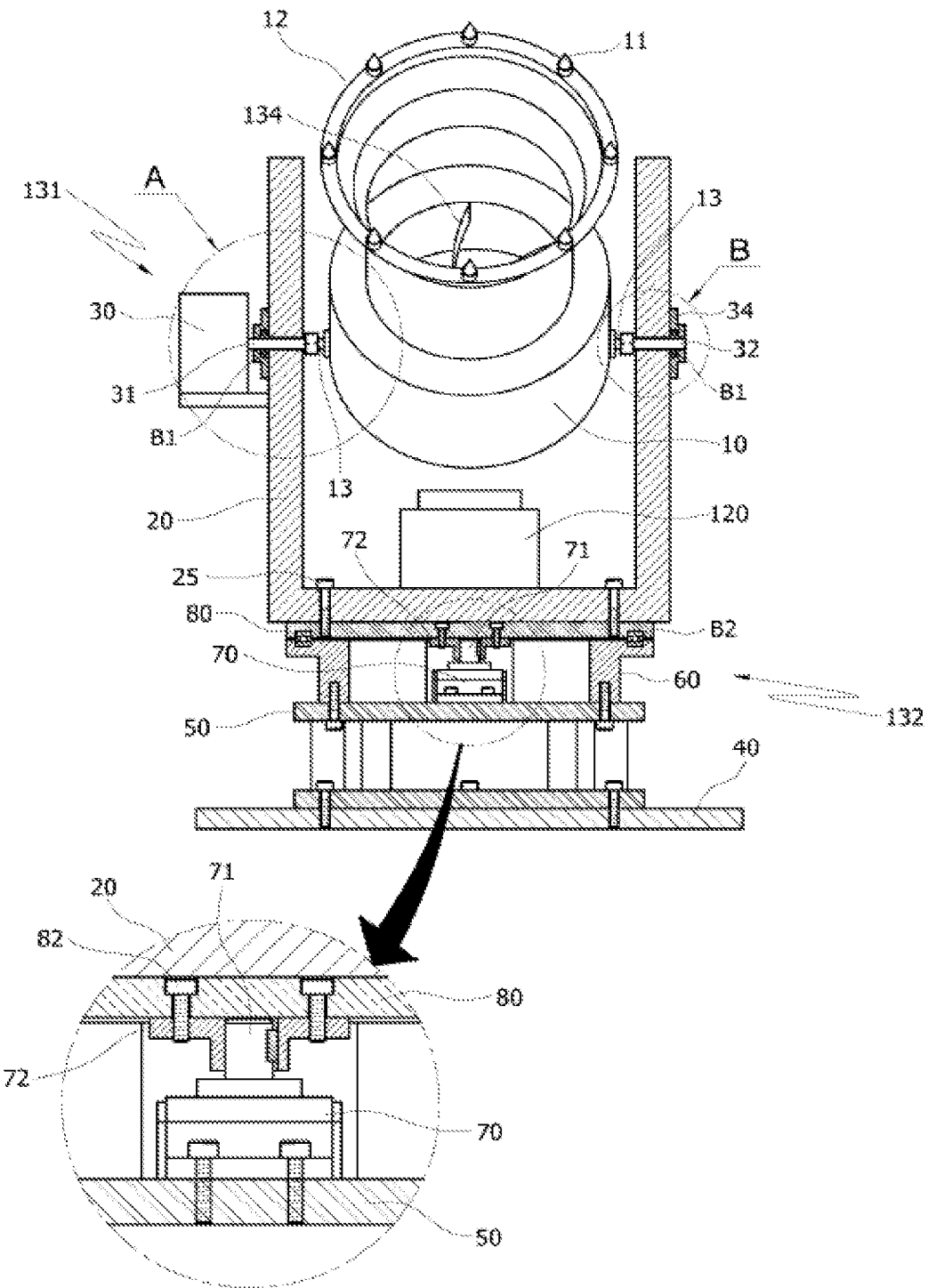
FIG. 5 is a longitudinal sectional view showing the main portion of a vertical motion driving unit and a horizontal motion driving unit of the fugitive dust suppression system according to the present invention.
Figure 6:
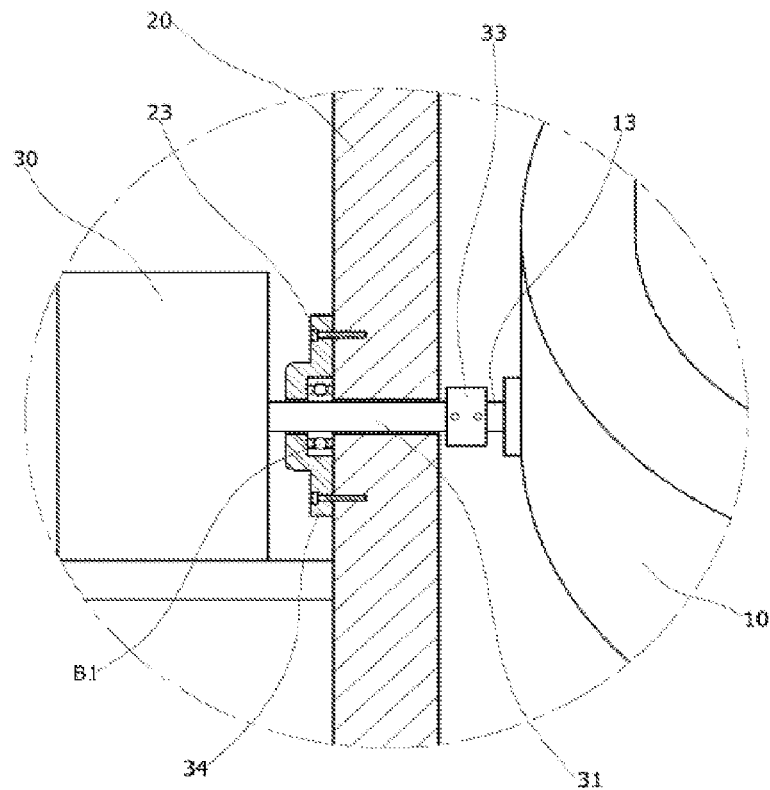
FIG. 6 is an enlarged view of a portion "A" of FIG. 5.
Figure 7:
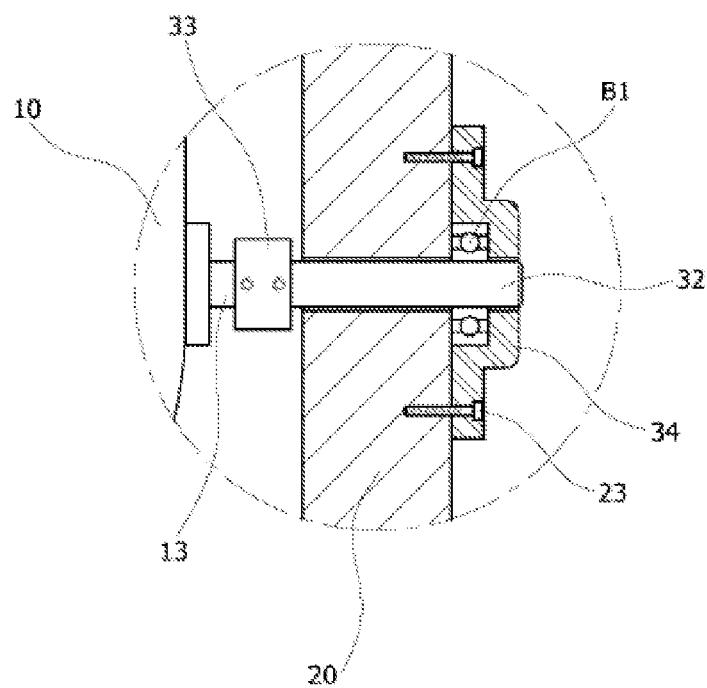
FIG. 7 is an enlarged view of a portion "B" of FIG. 5.
Figure 8:
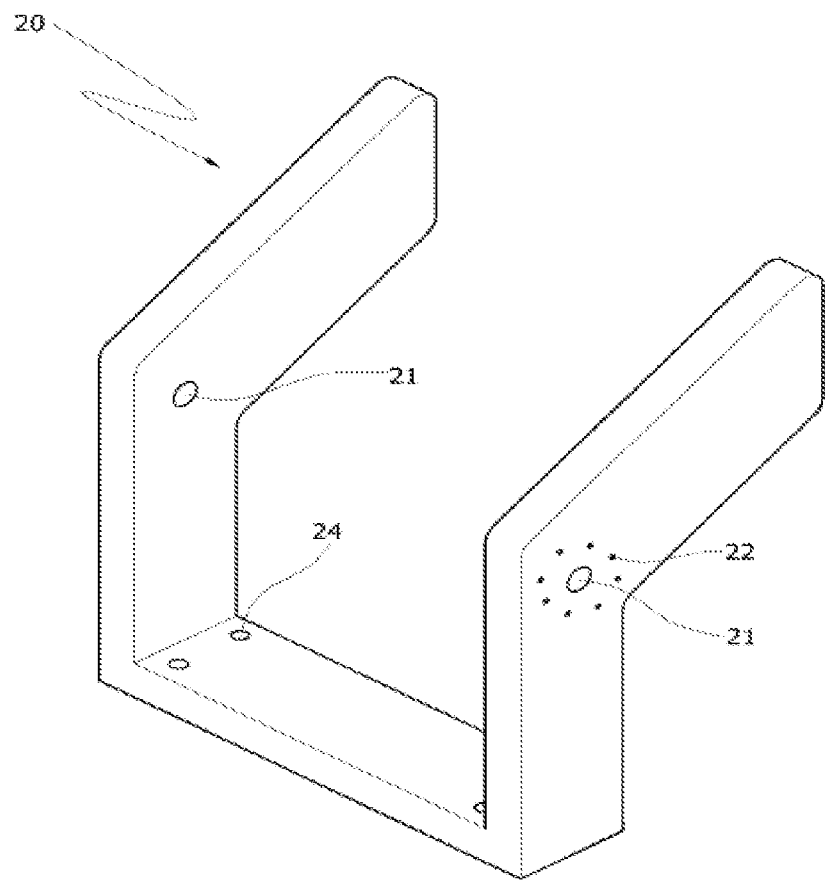
FIG. 8 is a perspective view showing a frame of the fugitive dust suppression system according to the present invention.
Figure 9:
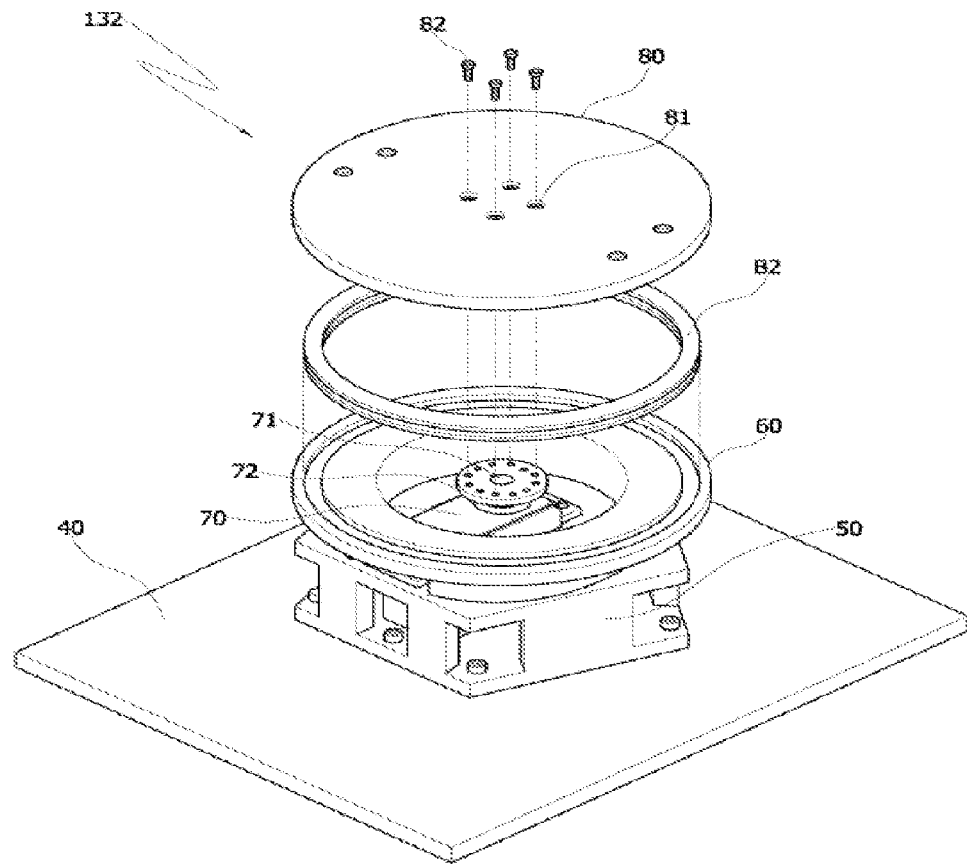
FIG. 9 is a separate perspective view showing a portion of the horizontal motion driving unit of the fugitive dust suppression system according to the present invention.
Figure 10:
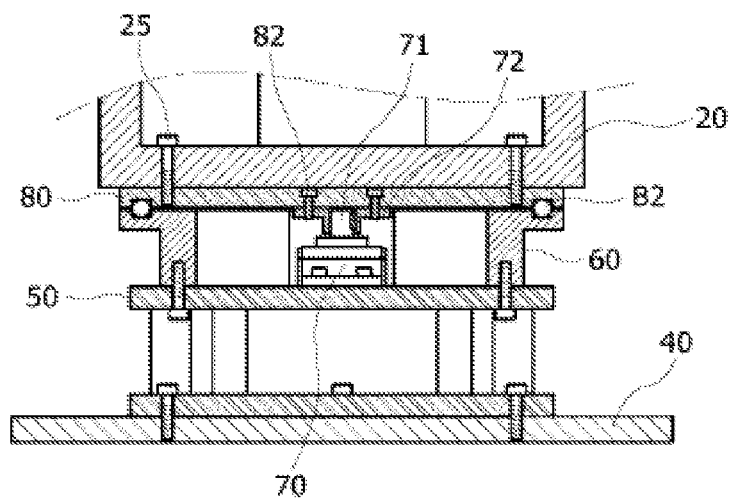
FIG. 10 is a longitudinal sectional view showing the main portion in another example of the horizontal motion driving unit of the fugitive dust suppression system according to the present invention.
Figure 11:
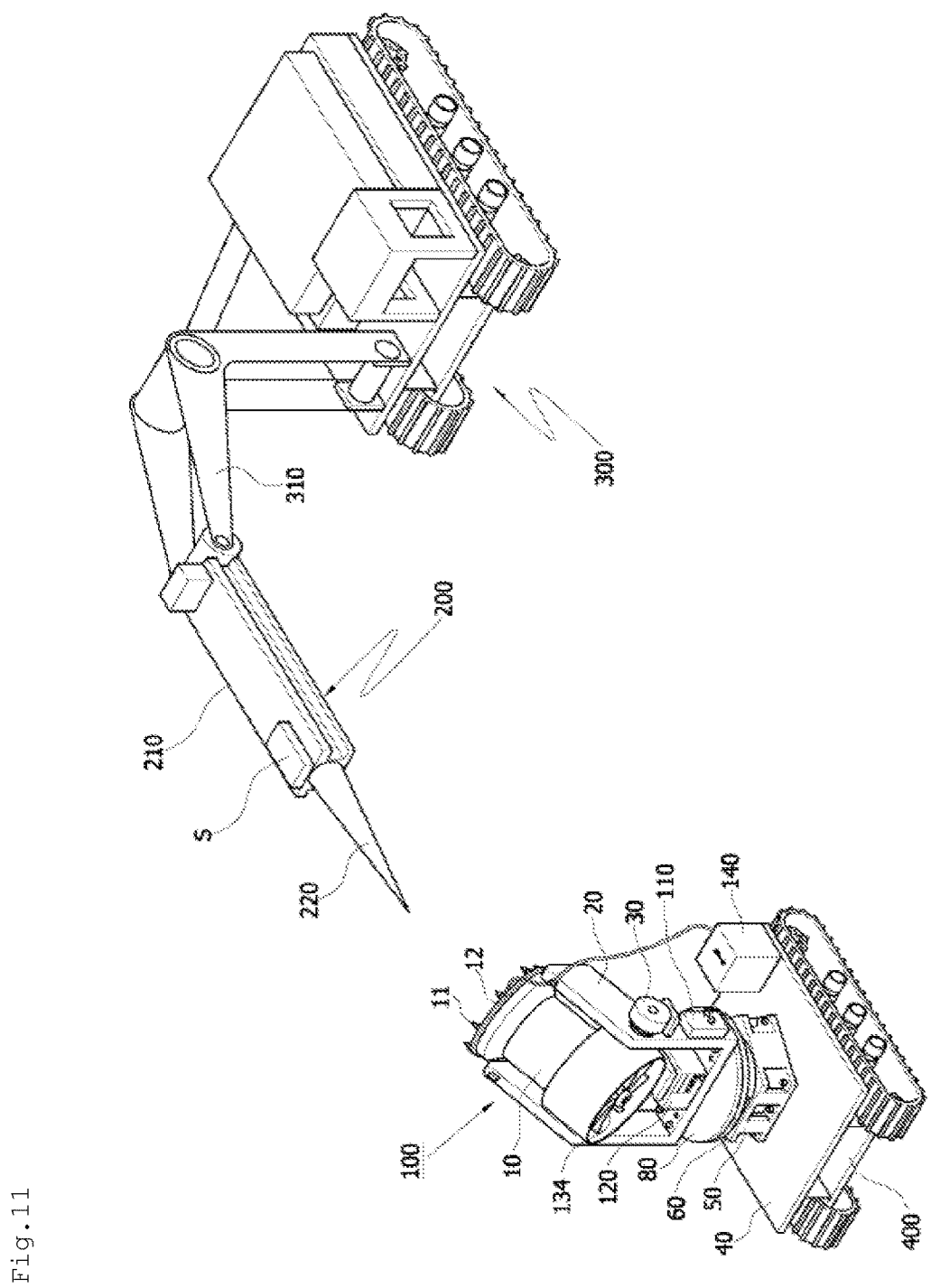
FIG. 11 is a perspective view showing the use state of the fugitive dust suppression system according to the present invention.

FIG. 3 is a block diagram showing a sensor-based motion control fugitive dust suppression system according to the present invention, FIG. 4 is a perspective view showing the sensor-based motion control fugitive dust suppression system according to the present invention, FIG. 5 is a longitudinal sectional view showing the main portion of a vertical motion driving unit and a horizontal motion driving unit of the fugitive dust suppression system according to the present invention, FIG. 6 is an enlarged view of a portion "A" of FIG. 5, FIG. 7 is an enlarged view of a portion "B" of FIG. 5, FIG. 8 is a perspective view showing a frame of the fugitive dust suppression system according to the present invention, FIG. 9 is a separate perspective view showing a portion of the horizontal motion driving unit of the fugitive dust suppression system according to the present invention, FIG. 10 is a longitudinal sectional view showing the main portion in another example of the horizontal motion driving unit of the fugitive dust suppression system according to the present invention, and FIG. 11 is a perspective view showing the use state of the fugitive dust suppression system according to the present invention.

As shown in FIGS. 3 to 11, a sensor-based motion control fugitive dust suppression system 100 according to the present invention includes: a laser pointer 500 provided on a frame 20 to conduct a setting operation such that directions of a plurality of mist spray injection nozzles 11 provided on a blast pipe 10 located inside the frame 20 correspond to the front end of a chisel 220 of a hydraulic breaker, which is a hitting part of a crushing machine 200; a data logger 110 for collecting, from a sensor S provided on the crushing machine 200, location source information on a hitting impact point of the hitting part; and a system controller 120 having a location information processing unit 121 adapted to analyze the location source information collected from the data logger 110 so as to generate the location information on the hitting impact point of the hitting part and for outputting a control signal so that under the control signal, a driver 130 rotates the blast pipe 10 in a vertical or horizontal direction according to the location source information. In this case, the fugitive dust suppression system according to the present invention is controlled such that the fugitive dust suppression system and the hitting impact point of the crushing machine 200 correspond to each other with respect to real-time motion. At this time, the crushing machine 200 is any one of a hydraulic breaker and a crusher connected to the front ends of arms 310 of an excavator 300.

Further, the data logger 110 is disposed on the outer surface of one side lower portion of the frame 20 as will be discussed later under the blast pipe 10 of the fugitive dust suppression system 100, and the system controller 120 is disposed on the bottom surface of the interior of the frame 20.

Further, the sensor S is attached to the front end of the top surface of a body 210 of the crushing machine 200 mounted on the front ends of the arms 300 of the excavator 300, and the sensor S detects the location source information on the moving direction or distance of the hitting part of the crushing machine 200, that is, the chisel 220 of the hydraulic breaker, or a ball mill, a hammer, and a jaw, which are not shown, and transmits the location source information on the hitting part of the crushing machine 200, through any one of wired or wireless communication, or image, to the data logger 110. At this time, the sensor S may be attached to the arms 310 of the excavator 300 in consideration of the crushing machine 200 and the structure removal site.

Further, the system controller 120 includes a control program 122 used to convert the location information of the location information processing unit 121 into a control value for controlling the driver 130 and a command signal generating unit 123 for converting the control value into a command signal to output the command signal.

The driver 130 includes a vertical motion driving unit 131 for rotating the blast pipe 10 of the fugitive dust suppression system 100 to a given angle in upward and downward directions, a horizontal motion driving unit 132 for rotating the blast pipe 10 to an angle of 360°, a solenoid valve 133 for adjusting a quantity of water supplied from a water tank 140 to the interior of a misting ring 12 having the plurality of mist spray injection nozzles 11 mounted therearound, and a propeller fan 134 disposed at the interior of the blast pipe 10 to suck air into the blast pipe 10, adjust the strength of blasting air, and discharge the sucked air to the outside.

The vertical motion driving unit 131 includes the frame 20 having a shape of a wing to rotatably support a motor shaft 31 and a rotary shaft 32 thereagainst, the motor shaft 31 and the rotary shaft 32 being connected to fixed shafts 13 symmetrically fixed to both side peripheral surfaces of the blast pipe 10, a first rotary motor 30 fixedly disposed on the outer surface of one side of the frame 20 in such a manner as to be rotated forwardly and reversely, the first rotary motor 30 being adapted to drive the motor shaft 31, and first bearings B1 disposed symmetrically on the outer surfaces of both sides of the frame 20 to rotatably insert the motor shaft 31 and the rotary shaft 32 thereinto. At this time, the frame 20 has a plurality of second coupling holes 24 formed thereon in such a manner as to be fixedly mounted on a turn table 80 of the horizontal motion driving unit 132 as will be discussed later through bolts 25 coupled to the coupling holes 24.

The first rotary motor 30 is desirably a tilt motor, and in this case, the motor shaft 31 of one side of the first rotary motor 30 and the rotary shaft 32 of the other side thereof are rotatably inserted into first coupling holes 21 of the frame 20 in such a manner as to be connected to the fixed shafts 13 of the blast pipe 10 by means of couplings 33. Further, the first bearings B1 disposed on both side surfaces of the frame 10 are accommodated in bearing cases 34, and the bearing cases 34 are fixedly mounted on nuts 22 of the frame 20 by means of bolts 23. Through the driving of the first rotary motor 30, accordingly, the blast pipe 10 is rotated to a given angle upwardly and downwardly with respect to the fixed shafts 13.

Moreover, the first bearings B1 are desirably ball bearings so that the motor shaft 31 and the rotary shaft 32 are gently rotated.

The horizontal motion driving unit 132 includes a moving equipment connection plate 40 fixedly mounted on moving equipment 400, a polygonal base 50 mounted on top of the moving equipment connection plate 40, a cylindrical support member 60 mounted on top of the base 50, a second rotary motor 70 fixedly mounted on top of the base 50 at the inside of the support member 60 in such a manner as to be rotated forwardly and reversely, the turn table 80 fixedly disposed on a connection member 72 insertedly fixed to a motor shaft 71 of the second rotary motor 70 and adapted to fix the frame 20 of the vertical motion driving unit 131 to the top surface thereof in such a manner as to be rotated to an angle of 360°, and second bearings B2 interposed between the peripheries of the turn table 80 and the support member 60. At this time, the second rotary motor 70 is desirably a reduction motor, and the turn table 80 is fixedly disposed on the connection member 72 through bolts 82 insertedly coupled to a plurality of bolt coupling holes 81 formed thereon and is thus rotated to the angle of 360° around the motor shaft 71 by means of the driving of the second rotary motor 70. As the frame 20 of the vertical motion driving unit 131 is rotated, at the same time, the blast pipe 10 is rotated to the angle of 360°.

Also, the second bearings B2 are adapted to gently rotate the turn table 80, and in the drawing, they are shown as thrust bearings. As shown in FIG. 10, further, the second bearings B2 may be a plurality of steel balls.

Further, the moving equipment connection plate 40 of the fugitive dust suppression system 100 is desirably mounted not on top of wheel-shaped moving equipment (not shown), but on top of the endless moving equipment 400 as shown in FIG. 11, so that the fugitive dust suppression system 100 can be freely moved on a place like a bridge wherein a ground condition is extremely bad.

Even if not shown, moreover, the moving equipment connection plate 40 of the fugitive dust suppression system 100 may be of course mounted on top of lifting equipment like a sky car.

The laser pointer 500 is attached to the top surface of one side of the frame 20 of the fugitive dust suppression system 100. The laser point 500 serves to conduct a setting operation so that the directions of the nozzles 11 of the fugitive dust suppression system 100 correspond to the position of the hitting part of the crushing machine 200 before the system controller 120 is driven. At this time, the position of the laser pointer 500 is not limited only to the top surface of one side of the frame 20, and if necessary, the laser pointer 500 may be attached to the blast pipe 10 or the system controller 120.

Now, an explanation on the operation of the fugitive dust suppression system 100 according to the present invention will be in detail given.

First, the laser point 500 attached to the top surface of one side of the frame 20 of the fugitive dust suppression system 100 is turned "on" to conduct the setting operation through the emission of laser so that the directions of the nozzles 11 disposed around the misting ring 12 of the fugitive dust suppression system 100 correspond to the front end of the hitting part of the crushing machine 200, that is, the front end of the chisel 220 of the hydraulic breaker as the hitting part of the crushing machine 200.

If the system controller 120 is driven, after that, the sensor S mounted on the top surface of the body 210 of the crushing machine 200 detects the location source information on the moving direction and distance to the sharp front end of the chisel 220 as the hitting part of the crushing machine 200.

The location source information of the chisel 220 of the crushing machine 200 detected from the sensor S is transmitted to the data logger 110, and the location source information transmitted to the data logger 110 is transmitted to the location information processing unit 121 of the system controller 120 through A/D conversion.

The location information processing unit 121 analyzes the location source information received from the data logger 110 and thus generates the location information on a hitting impact point of the crushing machine 200, that is, a hitting impact point at which the chisel 220 of the crushing machine 200 hits a structure (not shown).

The location information on the hitting impact point of the crushing machine 200, which is generated from the location information processing unit 121, is transmitted to the control program 122, and through the control program 122, next, the location information is converted into the control value for controlling the driver 130 so that the control value is transmitted to the command signal generating unit 123 of the system controller 120.

The command signal generating unit 123 converts the control value into the command signal and transmits the command signal to the driver 130, so that according to the command signal transmitted from the command signal generating unit 123 of the system controller 120, the operations of the driver 130 of the fugitive dust suppression system 100, that is, the operations of the vertical motion driving unit 131, the horizontal motion driving unit 132, the solenoid valve 133, and the propeller fan 134 are automatically controlled.

In accordance with the control signal of the system controller 120, therefore, the blast pipe 10 of the fugitive dust suppression system 100 is rotated to a given angle upwardly and downwardly through the vertical motion driving unit 131 and rotated to an angle of 360° through the horizontal motion driving unit 132, so that the blast pipe 10 is controlled to allow the mist injection directions of the nozzles 11 to correspond to the hitting impact point of the crushing machine 200. When a structure like a building or bridge is broken by using the chisel 220 of the crushing machine 200 on the removal site thereof, accordingly, mist spray is injected from the nozzles 11 toward the hitting impact point at which fugitive dust is most seriously generated, thereby minimizing the fugitive dust scattering in the air, and further, the unnecessary injection of the mist toward other points deviated from the hitting impact point of the crushing machine 200 is prevented, thereby reducing an amount of water consumed and minimizing the environmental pollution of soil.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A sensor-based motion control fugitive dust suppression system comprising:
   a laser pointer provided on a frame to conduct a setting operation such that directions of a plurality of mist spray injection nozzles provided on a blast pipe located inside the frame correspond to the front end of a chisel of a hydraulic breaker, which is a hitting part of a crushing machine;
   a data logger for collecting, from a sensor provided on the crushing machine, location source information on a hitting impact point of the hitting part; and
   a system controller having a location information processing unit adapted to analyze the location source information collected from the data logger so as to generate the location information on the hitting impact point of the hitting part and for outputting a control signal so that under the control signal, a driver rotates the blast pipe in a vertical or horizontal direction according to the location source information,
   wherein the fugitive dust suppression system and the hitting impact point of the crushing machine correspond to each other with respect to real-time motion.

2. The system according to claim 1, wherein the system controller further comprises:
   a control program used to convert the location information of the location information processing unit into a control value for controlling the driver; and a command signal generating unit for converting the control value into a command signal to output the command signal.

3. The system according to claim 1, wherein the driver comprises:
a vertical motion driving unit for rotating the blast pipe to a given angle in upward and downward directions;
a horizontal motion driving unit for rotating the blast pipe to an angle of 360°;
a solenoid valve for adjusting a quantity of water supplied from a water tank to the interior of a misting ring having the plurality of mist spray injection nozzles mounted therearound; and
a propeller fan disposed at the interior of the blast pipe to suck air into the blast pipe, adjust the strength of blasting air, and discharge the sucked air to the outside.

4. The system according to claim 1, wherein the crushing machine is any one of a hydraulic breaker and a crusher connected to the front ends of arms of an excavator.

5. The system according to claim 3, wherein the vertical motion driving unit comprises:
the frame having a shape of a wing to rotatably support a motor shaft and a rotary shaft thereagainst, the motor shaft and the rotary shaft being connected to fixed shafts symmetrically fixed to both side peripheral surfaces of the blast pipe;
a first rotary motor fixedly disposed on the outer surface of one side of the frame in such a manner as to be rotated forwardly and reversely, the first rotary motor being adapted to drive the motor shaft; and
first bearings disposed symmetrically on the outer surfaces of both sides of the frame to rotatably insert the motor shaft and the rotary shaft thereinto.

6. The system according to claim 5, wherein the first rotary motor is a tilt motor.

7. The system according to claim 3, wherein the horizontal motion driving unit comprises:
a moving equipment connection plate fixedly mounted on moving equipment;
a base mounted on top of the moving equipment connection plate;
a support member mounted on top of the base;
a second rotary motor fixedly mounted on top of the base at the inside of the support member in such a manner as to be rotated forwardly and reversely;
a turn table fixedly disposed on a connection member insertedly fixed to a motor shaft of the second rotary motor to fix the frame of the vertical motion driving unit to the top surface thereof in such a manner as to be rotated to an angle of 360°; and
second bearings interposed between the peripheries of the turn table and the support member.

8. The system according to claim 7, wherein the second rotary motor is a reduction motor.

* * * * *